(12) United States Patent
Papierniak (10) Patent No.: US 6,671,689 B2
(45) Date of Patent: Dec. 30, 2003

(54) DATA WAREHOUSE PORTAL (75) Inventor: Karen Papierniak, Fenton, MI (US)

(73) Assignee: NCR Corporation, Dayton, OH (US)

( * ) Notice: Subject to any disclaimer, the term of this patent is extended or adjusted under 35 U.S.C. 154(b) by 276 days.

(21) Appl. No.: 09/764,115

(22) Filed: Jan. 19, 2001

(65) Prior Publication Data

US 2002/0099710 A1 Jul. 25, 2002

(51) Int. Cl.[7] .............................. G06F 7/00; G06F 17/00
(52) U.S. Cl. ........................ 707/100; 707/3; 715/513; 715/514; 715/526
(58) Field of Search .......................... 707/1–5, 100–102, 707/104.1, 200, 205, 509, 513–514; 709/200–203; 715/509, 513–514, 526

(56) References Cited

U.S. PATENT DOCUMENTS

| | | |
|---|---|---|
| 5,230,072 A | 7/1993 | Smith et al. |
| 5,600,827 A | 2/1997 | Nakabayashi et al. |
| 5,675,785 A | 10/1997 | Hall et al. |
| 2002/0049617 A1 * | 4/2002 | Lencki et al. ................. 705/4 |

OTHER PUBLICATIONS

Sahuguet et al., "Looking at the Web throught XML glasses", University of Pennsylvania, pp. 1–12.*

* cited by examiner

Primary Examiner—Alford Kindred
(74) Attorney, Agent, or Firm—Lowe Hauptman Gilman & Berner, LLP (57) ABSTRACT

The present invention is a data warehouse portal for providing a client with an overall view of one or more data warehouses to aid in the analysis of data in the warehouse(s). The portal allows the client to gain an insight about the data to determine how the data is used, who uses the data, if additional data sources are required, and what impact a data change may have. The portal reads and/or searches metadata and/or XML schemas from the data warehouses and tools available for accessing data stored in the data warehouse, and display the data warehouse information through a browser in numerous ways, such as hierarchical, user and application views. Other views may include extraction, usage, historical and comparison.

30 Claims, 8 Drawing Sheets

DATA WAREHOUSE PORTAL

FIELD OF THE INVENTION

The present invention relates generally to data warehousing, and more particularly, to a data warehouse portal capable of allowing a client to gain an insight about a data warehouse implementation to determine how the data is used, who and what tool uses the data, if additional data sources are required, and what impact a data change may have.

BACKGROUND OF THE INVENTION

Every day large and small organizations create billions of bytes of data about all aspects of their business, millions of individual facts about their customers, products, operations and people. For the most part, this data is locked up in a countless number of computer systems and is exceedingly difficult to get at. Before, only a small fraction of the data that is captured, processed and stored in the enterprise is actually available to executives and decision makers.

To survive and prosper in an increasingly competitive world, especially in the 1990s and beyond, businesses have to analyze, plan and react to changing business conditions in a much more rapid fashion. To do this, executives and decision makers must be able to get their hands on critical information that already exists in the organization. A set of concepts and tools have evolved into a new technology—data warehousing—which provides organizations a flexible, effective and efficient way of getting at the enormous amount of data that are one of the organizations' most critical and valuable assets.

A data warehouse is an informational system rather than an operational system that helps run the enterprise's daily operations. A data warehouse is generally designed to support decision making relating to "marketing planning", "engineering planning", "financial analysis" etc. in an organization. The data in a data warehouse may be historical/static and/or dynamic, and may also contain numerous summaries. It is structured to support a variety of analyses, including elaborate queries on large amounts of data that can require extensive searching.

However, current data warehouse implementation are growing in many ways:
- the amount of data stored, e.g. the amount of historical transaction data kept being expanded from 52 weeks to 104 weeks of data;
- the type of data added, e.g. the addition of call center and web data;
- the number and type of users accessing the data, e.g. marketing, sales, vendors, buyers, web site designers, operations etc.; and
- the number and types of applications accessing the data, e.g. OLAP, Data Mining, SQL, XML, Extractions, Visualization, Segmentation etc.

To accommodate new data sets and applications: databases, tables and fields will be added to the warehouse. The data warehouse designers and administrators will find it increasingly difficult to understand the use and details of each data element. Thus, there is a need for a method and tools to provide the data warehouse designers and administrators an overall view of the data warehouse implementation so they can understand the data structure of an data element and which users are accessing the data element through which application at a certain point in time. None of prior approaches have been known to provide this feature.

Each individual tool and application GUI (Graphic User Interface) application may have an administrator interface to view current data elements, data relationships, users, reports or extractions. However, there is a problem of interoperability. For example, churn reports implemented using an OLAP application cannot be viewed by another OLAP, data mining, visualization, classification, tool or Business Intelligence application. In the future this interoperability issues will be minimized when application vendors adopt a metadata standard or an industry specific XML schema. But today each toll gives the client its specific view of the data warehouse which is limited and does not show if a data element is accessible by other tools or users.

Report Portals, made available by Report2Web and Cognos Upfront, provide users with a browser interface to access reports, documents, and spread sheets published on a web site. A Report Portal also offers a single sign-on, batch updates, searching report titles, moving the reports into a user's favorite section, and access to ad hoc reporting tools. The Report Portals do not require applications to be installed on the client station or tool-specific user training. However, the Report Portals provide little insight about the data relationships, users, extractions or the applications that use them.

RO/CRM (Relationship Optimizer/Customer Relationship Management) Framework suite, made available by NCR Corporation, provides three client interfaces which are CRM Foundation Administration GUI, CRM Workbench and Application GUI, and CRM Application GUI. These interfaces provide the client with a single interface for data elements, relationships, users, reports, extractions, segmentations and the CRM applications that accesses them. The CRM framework allows the users to view the data and select a CRM tool from the same interface, but so far does not include other type of applications or reports.

A closer approach is made available by SAS Institute Inc. in SAS MetaSpace Explorer. SAS MetaSpace Explorer is browser-based tool (a Java applet) used to find and view business info in a data warehouse. MetaSpace Explorer takes the info, contents of data items and metadata, correctly exported by SAS/Warehouse Administrator and present it logically. The info can be displayed in three ways: by subject, owner or data types. The SAS MetaSpace Explorer requires the metadata provided by other SAS components, and hence, is not application independent.

Though MetaSpace Explorer displays information about data, such as a description written by the warehouse administrator or details about where and how the data is maintained, the major function of the MetaSpace Explorer applet is to view the contents of data items in a data warehouse, rather than to view a data structure of the data elements under which the data items are stored.

The MetaSpace Explorer displays the groups of data that make up the data warehouse. The view contains a list of folders, with each folder corresponding to a logical group of data, such as all data relating to sales or all data owned by a certain person. However, MetaSpace Explorer does not provide information on applications or tools which can be used by the data owners to access the data.

Thus, none of the previously mentioned techniques can provide an overall picture of a data warehouse implementation with an insight about how the data is used, who and which application uses the data, if additional data sources are required, and what impact a data change may have. The previously mentioned techniques also seem incapable of warning the client of new data sets and applications being added to the data warehouse.

In practice, there are various tools that access data in a data warehouse and each tool needs the data differently, manipulates on the data differently, and presents the manipulated data to a user differently. In a very typical operation, for example, customer evaluation, a tool often loads the data items from a data element, e.g. a table, puts the data items into another format, manipulates on them, and stores the manipulated data in another, usually temporary, table. In some cases, the temporary table may be left in the data warehouse for later access by the same tool. But, the data stored in the temporary table may be of a special interest to another tool which, without the knowledge of the presence of temporary table, may create the table again. This consumes unnecessary processing time and storage space.

Thus, there is a need for a method and apparatus which highlight new data sets and/or applications being added to a data warehouse, thereby eliminating the above kind of data duplication and allowing reusability of the data. The method and apparatus should be able to display to a client the changes or additions made to the data elements, relationships, user access, reports and applications. The changes/additions may also be outputted to another application or device, for example, in form of a XML message.

SUMMARY OF THE INVENTION

It is, therefore, an object of the present invention to provide a data warehouse portal for allowing a client, e.g. a database or report designer, an overall picture of the current warehouse implementation of one or more data warehouses to aid in the analysis of data in the data warehouses.

It is a further object of the present invention to allow the client to select a view of the data warehouse implementation by presenting (i) the data and the hierarchy; (ii) the users grouped by department or roles; and (iii) the reports or application used, including segmentation and measures.

It is another object of the present invention to make the client and/or software application and/or dedicated device aware of what data is available and what data is not, by comparing the current warehouse to a historical, planned, department specific or a generic vendor implementation.

It is yet a further object of the present invention to highlight new data elements, additional data, or changes made to data elements, measures, reports, hierarchy.

It is yet another object of the present invention to highlight planned additions of data elements, data, measures, reports, hierarchy.

It is still a further object of the present invention to provide a structured approach to requesting additional data or data elements to be added to the warehouse.

It is still another object of the present invention to provide well known web-like search and crawling tools to search for the data and the metadata in the warehouses.

It is yet still a further object of the present invention to provide a data warehouse portal which is data warehouse and application independent.

It is yet still another object of the present invention to present the information on an implementation of the data warehouse through a browser-based interface and/or as a XML response.

These and other objects of the present invention are achieved by a method of presenting an implementation of a data warehouse. In accordance with the method, an inquiry requesting information about at least a data element is received. Then, a data structure of the data element is retrieved from the data warehouse. Next, the following information are determined: (i) tools available for accessing the data element, and (ii) users using at least one of the tools to access the data element. Finally, a view is generated in response to the inquiry to show at least one of (i) the data structure retrieved in the retrieving step, (ii) the tools and (iii) the users determined in the determining step.

The foregoing and other objects of the present invention are achieved by a computer architecture for presenting an implementation of a data warehouse. Receiving means are provided for receiving an inquiry requesting information about at least a data element. Retrieving means are provided for retrieving a data structure of the data element from the data warehouse. Determining means are provided for determining (i) tools available for accessing the data element, and (ii) users using at least one of the tools to access the data element. Generating means are provided for generating a view in response to the inquiry showing at least one of (i) the data structure retrieved by the retrieving means, (ii) the tools and (iii) the users determined by the determining means.

The foregoing and other objects of the present invention are achieved by a computer system including a processor and a memory coupled to the processor. The memory having stored therein sequences of instructions, which, when executed by the processor, causes the processor to perform the steps of a) receiving an inquiry requesting information about at least a data element; b) retrieving a data structure of the data element from the data warehouse; c) determining (i) tools available for accessing the data element, and (ii) users using at least one of the tools to access the data element; and d) generating a view in response to the inquiry showing at least one of (i) the data structure retrieved in the retrieving step, (ii) the tools and (iii) the users determined in the determining step.

The foregoing and other objects of the present invention are achieved by an article for presenting an implementation of a data warehouse. At least one sequence of machine executable instructions is provided on a medium bearing the executable instructions in machine form, wherein execution of the instructions by one or more processors causes the one or more processors to a) receive an inquiry requesting information about at least a data element; b) retrieve a data structure of the data element from the data warehouse; c) determine (i) tools available for accessing the data element, and (ii) users using at least one of the tools to access the data element; and d) generate a view in response to the inquiry showing at least one of (i) the data structure retrieved in the retrieving step, (ii) the tools and (iii) the users determined in the determining step.

The foregoing and other objects of the present invention are achieved by a data warehouse portal for providing an insight of a data warehouse implementation of a plurality of data warehouses. The data warehouse portal comprises a parser, a tools administrator, and a page administrator and generator. The parser reads metadata schemas of each of the plurality of data warehouses, and metadata sets of each of a plurality of tools available for exploiting data stored in the plurality of data warehouses. The tools administrator obtains user information about users who use at least one of the plurality of tools to gain access to the data. The page administrator and generator receives an information inquiry, and generates a view in response to the information inquiry, based on at least one of the metadata schemas, the metadata sets, and the user information.

The foregoing and other objects of the present invention are achieved by a data warehouse portal system for providing an insight of a data warehouse implementation of a plurality of data warehouses. The data warehouse portal system comprises a client station housing a client browser for sending an information inquiry, and a data warehouse portal server connectable to the client station. The data warehouse portal server provides the client browser, in response to the information inquiry, with inquired information about data structures of, and tools and users accessing data elements of the data warehouses, rather than actual data items stored in the data warehouses under the data elements. The data warehouse portal server comprises a parser, a tools administrator, and at least one of HTML page and XML response generators. The parser reads at least one of metadata and XML schemas of each of the plurality of data warehouses, and at least one of metadata and XML schemas of each of a plurality of tools available for exploiting data stored in the data warehouses. The tools administrator obtains user information about users who use at least one of the tools to gain access to the data. The HTML page and XML response generators present the inquired information in response to the information inquiry, based on at least one of the metadata and XML schemas of the data warehouses and the tools, and the user information.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 5, 6 and 7 are examples illustrating the ways data warehouse implementation information can be displayed, wherein

BEST MODE FOR CARRYING OUT THE INVENTION

Methods and apparatus for dynamically translating data from one data model to another data model, and dynamically presenting the transformed data to applications written against the later data model are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
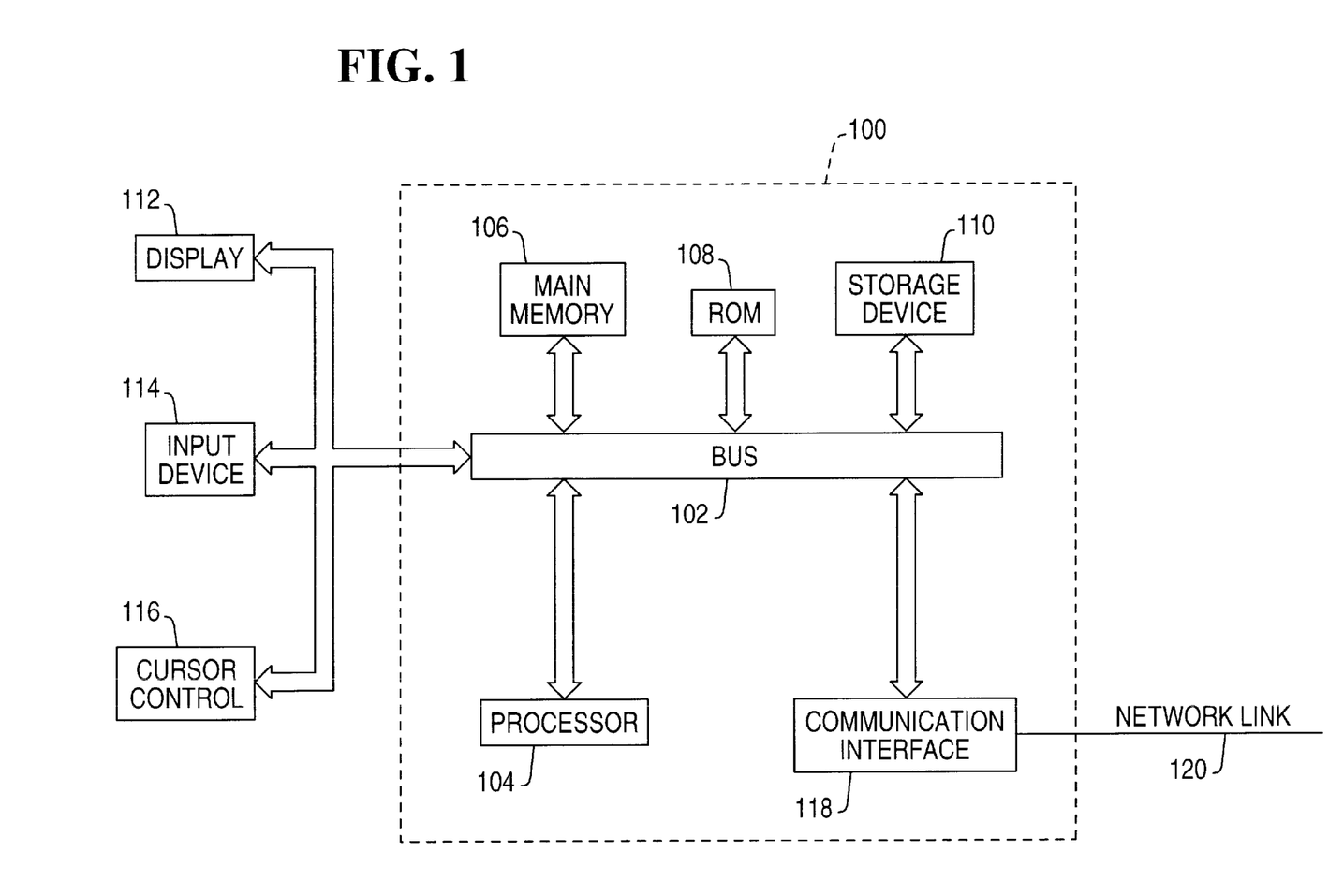
FIG. 1 is a high level block diagram of a computer architecture usable with the present invention.

FIG. 1 is a high level block diagram illustrating an exemplary computer system 100 upon which embodiments of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for generating information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to dynamically translate data from one data model to another data model, and dynamically present the transformed data to applications written against the later data model. According to one embodiment of the invention, the translating and presenting is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, CD-ROM, DV-DROM, or any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. For example, two or more computer systems 100 may be networked together in a conventional manner with each using the communication interface 118 via network link 120. The network link 120, for example, may provide a connection through local network (not shown) to a host computer (not shown) or to data equipment operated by an Internet Service Provider (not shown).

Computer system 100 can send messages and receive data, including program code, through the network link 120 and communication interface 118. The received code may be executed by processor 104 as it is received, and/or stored in storage device 110, or other non-volatile storage for later execution. In this manner, computer system 100 may obtain application code in the form of a carrier wave.

Figure 2:
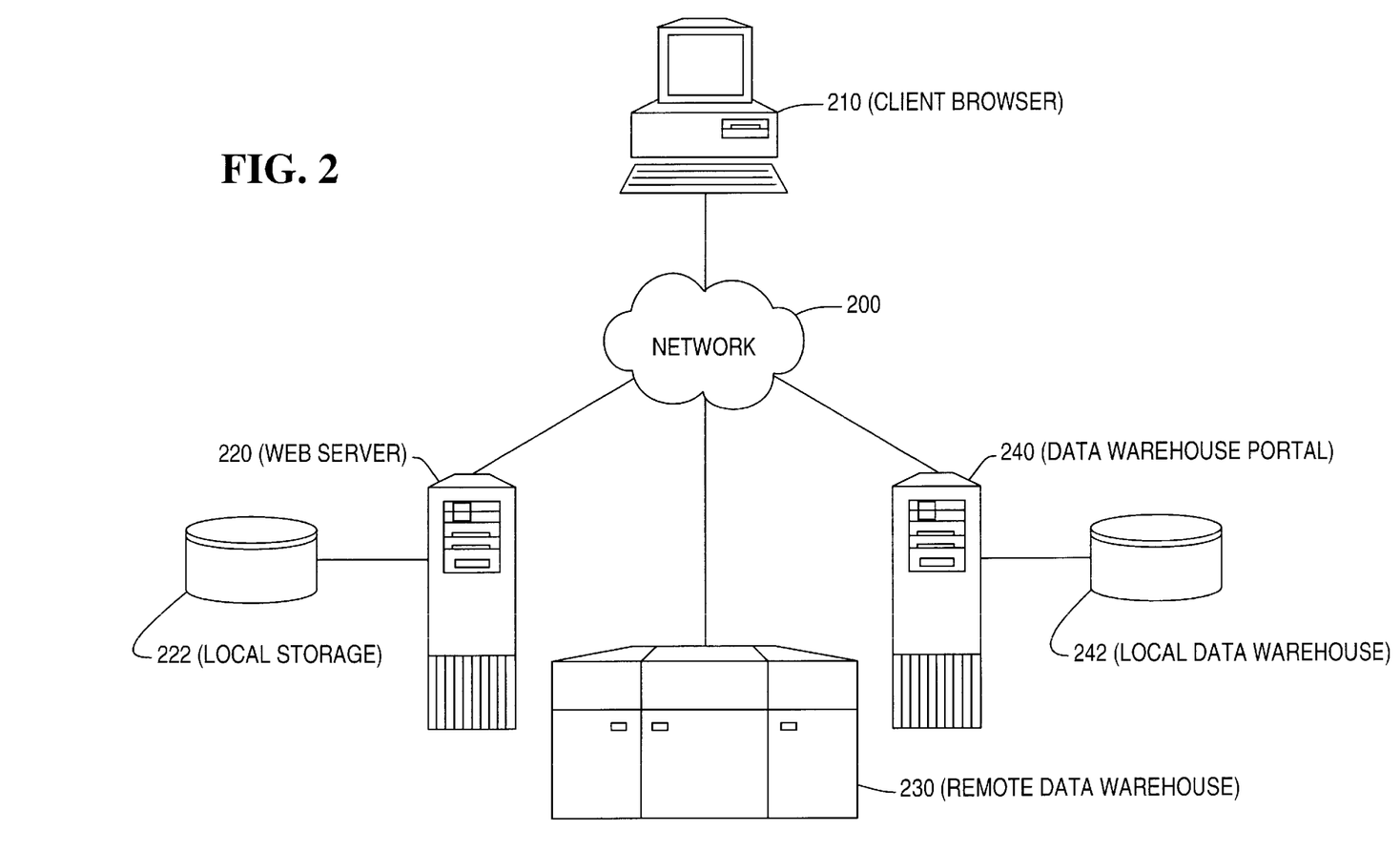
FIG. 2 is a diagram of a network in which the present invention can be implemented.

FIG. 2 is a diagram of a network 200 in which the present invention can be implemented. A client may access a web server 220 by executing a client web browser at a client station 210. Web browsers are well-known in the art, and are readily available from such corporations as Netscape Communications Corp. and Microsoft Corp. Though FIG. 2 illustrates a situation in which the client station 210 is connected with the web server 220 via the network 200, other arrangements may be implemented. For example, the web server 220 may function as an Internet Service Provider server for the client station 210 which is communicated with the web server 220 via network link 120 shown in FIG. 1.

The web server 220, according to one embodiment of the present invention, gathers information dynamically from one or more data sources, one of which is a data warehouse portal 240. The data warehouse portal 240 provides an interface between a plurality of data warehouses and the web server 220. One or more of the data warehouses, such as a local data warehouse 242, may be housed by the same computer complex of the data warehouse portal 240. Alternatively and/or additionally, one or more data warehouses, such as a remote data warehouse 230, may be implemented separately in another computer complex and is remotely accessed by the data warehouse portal 240 via, for example, the network 200.

In order to request information on the data warehouses, the client at the client station 210 activates a hyperlink, preferably having a URL (Uniform Resource Locator), by using, for example, the client browser. The web server 220 receives the request and forward it to the data warehouse portal 240 through SOAP (Simple Object Access Protocol), RMI (Remote Method Innovation) or COM (Component Object Model) interfaces. The data warehouse portal 240 searches through the data warehouses and generates a response, preferably in HTML (HyperText Markup Language) or XML (Extensible Markup Language), which is sent back to the web server 220. The response may be immediately forwarded by the web server 220 to the client station 210, or may be temporarily stored in a storage 222 of the web server 220 for sending out later.

Though the above discussion describes an implementation of the invention in a distributed, on-line and interactive environment, such as Internet, the invention can be implemented in other environments as well, provided that an appropriate communication link is established and maintained between the client station 210 and the data warehouse portal 240. It is also not necessary for the client to use the client browser at the client station 210 to send messages to and receive messages from the data warehouse portal 240. The messages may be of any format, and may be sent to any hard wired device, software application or combination thereof, for the client's convenience.

In a preferred embodiment, the client station 210 may be incorporated into the same computer complex of the data warehouse portal 240 without needing an intermediate web server 220. This is convenient for both an in-house IT engineer to obtain information about an implementation of his company data warehouses, and a service provider personnel wishing to perform on-site service for the data warehouses. The service provider personnel can also perform his service remotely through the network 200, as described in the foregoing discussion.

Figure 3:
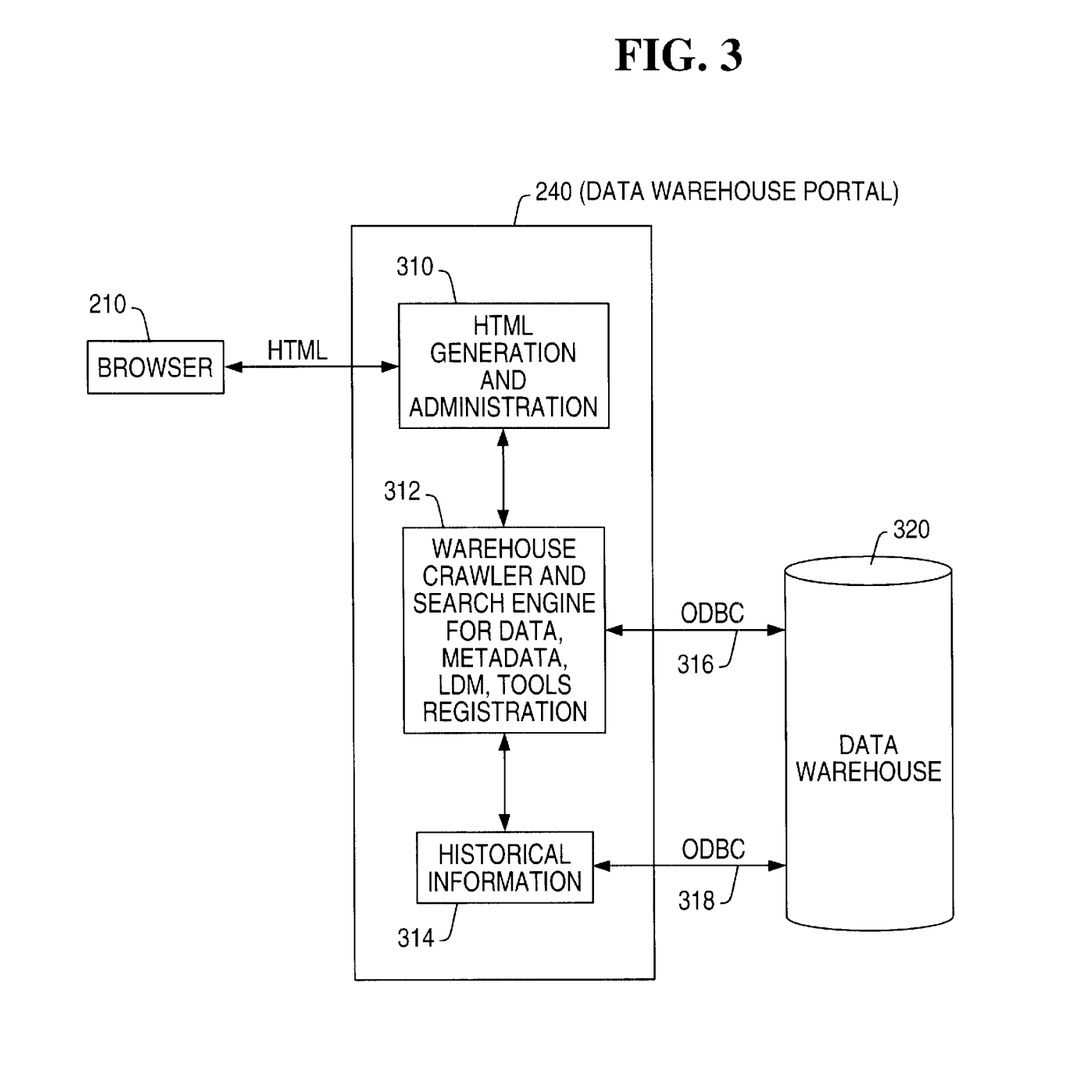
FIG. 3 is a block diagram showing components of a data warehouse portal in accordance with the invention.

FIG. 3 is a block diagram showing components of a data warehouse portal in accordance with an embodiment of the invention. The data warehouse portal 240 includes a HTML generation and administration component 310 for receiving an information request from the client station 210. Upon receiving the information request, the HTML generation and administration component 310 forward it to a processing component 312. The processing component 312 collects required information by accessing a data warehouse 320 in a manner described below, and returns the collected information to the HTML generation and administration component 310. A response is generated by the HTML generation and administration component 310 based on the collected information, and sent back to the client station 210. As discussed above, the response may be generated in other formats, such as XML, yet providing the client station 210 with appropriate required information.

Optionally, the processing component 312 may access a historical information component 314 for historical information relating to past/current/future status (updated, outdated, etc.) of the data warehouse implementation. This information is additionally transmitted to the client station 210 to present a more detailed insight of the data warehouse implementation. The historical information is transferred between the historical information component 314 and the data warehouse 320 via an ODBC (Open Database Connectivity) interface 318.

If the data warehouse 320 is already provided with a special database or databases (not shown) for storing the historical information, the historical information component 314 may be omitted from the data warehouse portal 240. In this case, the processing component 312 accesses directly the special database or databases of the data warehouse 320, via an ODBC interface 316, to determine update status of the data warehouse implementation. The same ODBC interface 316 may be used by the processing component 312 to collect information requested by the client station 210.

It is worthwhile noting that the interface between the data warehouse portal 240 and the data warehouse 320 is not necessarily ODBC. It could be a SQL (Structured Query Language) based or any type of connection capable of allowing an application to interrogate and process data in a database. The interface is preferably of a type which allows a platform-independent application, such as the data warehouse portal 240, to smoothly access the data warehouse 320. An example of this type of interface is JDBC (Java Database Connectivity).

Figure 4:
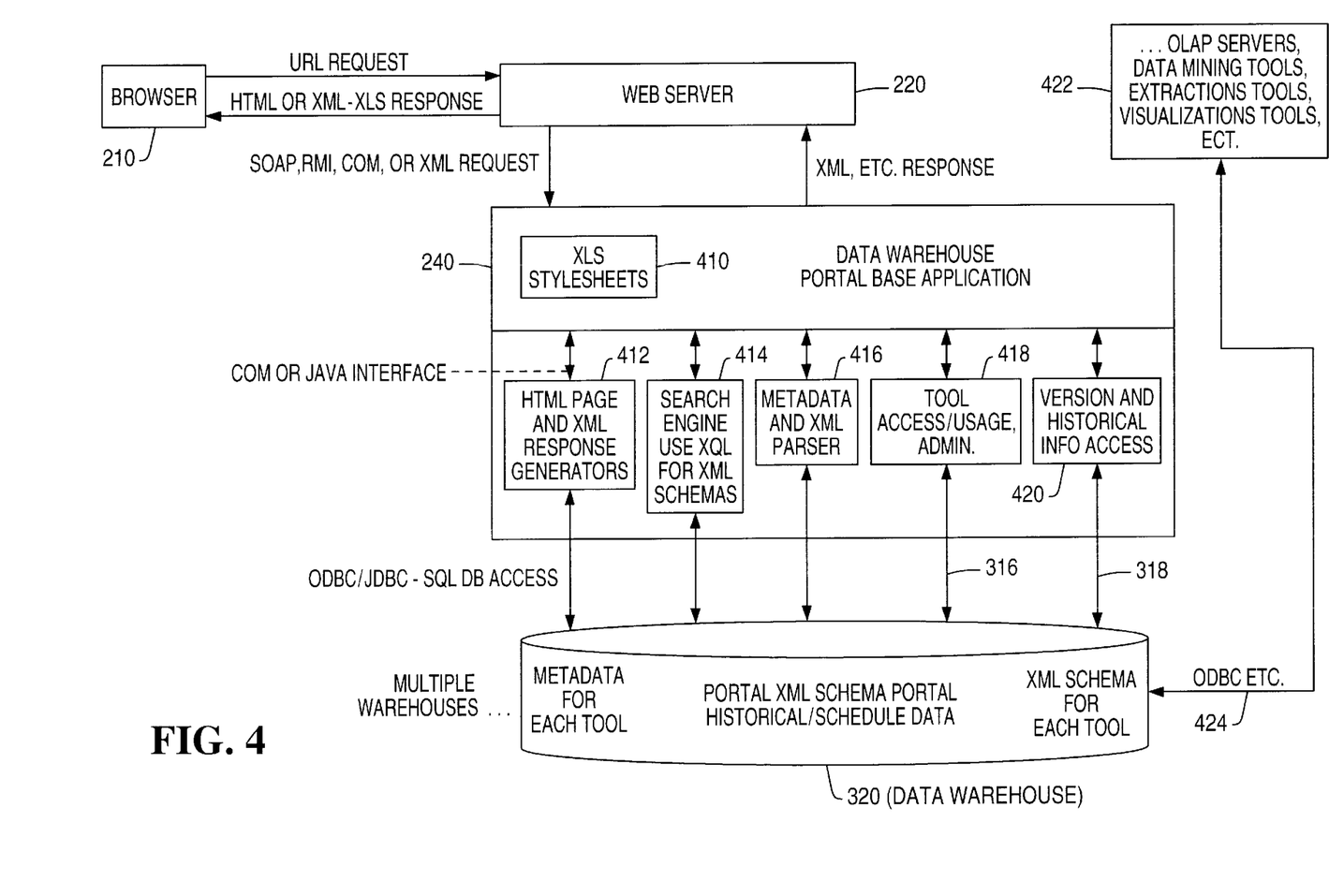
FIG. 4 is an expanded block diagram of the data warehouse portal depicted in FIG. 3.

FIG. 4 is an expanded block diagram of the data warehouse portal 240 depicted in FIG. 3. As shown in FIG. 4, a data warehouse portal base application includes a HTML/XML page generator 412, a search engine/crawler 414, a metadata/XML parser 416, a tool administrator 418, and a version and historical information access 420. The data warehouse 320 is interrogated by these modules of the data warehouse portal 240 via ODBC interfaces 316, 318 as described above. The same kind of ODBC interface 424 may be used by numerous tools 422 to exploit data stored in databases of the data warehouse 320.

Advantageously, the user interface of the data warehouse portal 240 is customizable using standard XML, XSL (Extensible Stylesheet Language) and DHTML (Dynamic HTML) tools. For example a XSL stylesheets 410 is provided as an interface between the data warehouse portal 240 and the web server 220. The XSL stylesheets 410 is a master page layout which stores layout settings for a particular category of document. When a style sheet is selected, its format settings are applied to all the documents created under it, saving time and effort for redefining the same settings over and over again for each page. The XSL stylesheets 410 communicates with the other modules of the data warehouse portal 240 through COM or Java interfaces.

The metadata/XML parser 416 is arranged to access metadata of the data warehouse 320 which is usually stored a file or database of the data warehouse 320 to hold information about the other databases' structure, attributes, processing or changes. More particularly, the metadata/XML parser 416 reads a metadata schema of the data warehouse 320 which defines the data structure and the type of contents that each data element within the data structure can contain.

A data element is logical definition of a physical field in which actual data items are stored. Examples of data elements are but not limited to data warehouse sections, databases, database sections, tables, groups of table columns, and table columns. Data structures are physical layout of data. Data fields, memo fields, fixed length fields, variable length fields, records, word processing documents, spreadsheets, data files, database files, keys and indexes are all examples of data structures. As used herein, a data structure of a data element is intended to denote any structural characteristic of the data element, including a hierarchical level of the data element in the hierarchy of the data warehouse, and relationships between the data element and other data elements of the data warehouse. For example, when the data element is a table, the data structure of the table may comprise, besides the column arrangement within the table, a database and/or data warehouse section in which the table resides as well as links to other tables or columns which are related to one or more columns of the table of interest.

Thus, by reading the metadata describing the data warehouse 320, the metadata/XML parser 416 can provide the client station 210 with an insight of the data structure of each data element of the data warehouse 320.

In addition, the metadata/XML parser 416 can also read metadata sets of each of the tools 422 used to exploit data stored in the data warehouse 320. As shown in FIG. 4, there are many tools 422 available to help the user analyze or search for data. Typically, these tools are OLAP (Online Analytical Processing) tools, Data Mining tools, Extraction tools, Visualization tools, Segmentation tools etc. An OLAP tool is a decision support software that allows the user to quickly analyze information that has been summarized into multidimensional views and hierarchies. For example, OLAP tools are used to perform trend analysis on sales and financial information. They can enable users to drill down into masses of sales statistics in order to isolate the products that are the most volatile. A Data Mining tool repeatedly slices and dices the data until a pattern becomes obvious. An Extraction tool performs one of functions needed when pulling data out of a database and placing it into another of a different type. Sometimes, in order to put the pulled data in another type, some manipulation on the data is needed. A Visualization tool allows grouping and presenting data in different ways. For example, transaction data and summary information can be transferred into charts and graphs for easier understanding of the data. Optionally, the visualization can be rendered in 3-D models and data is presented by dimension, shape, color etc. A Segmentation tool functions like a data filter which segments the whole data stored in a database into smaller data blocks, and feeds each block to an appropriate application for analyzing. Thus, only a fraction of data that meets certain criteria or is of special interest needs to be fed to analyzing tools which reduces processing load and increases processing speed.

Each of the various tools 422 has a specific metadata set that can be interpreted to understand what data is needed, how the needed data should be properly set up for the tool, and what manipulations are to be done on the data. The metadata sets are kept in a dedicated part of the data warehouse 320 and are accessible by the metadata/XML parser 416. By reading the metadata sets of the tools 422, the metadata/XML parser 416 can provide the client station 210 with an insight of what data elements are required for each tool and how the data items stored under those data elements will be manipulated on.

Information about the users who uses one or more of the tools 422 to analyze or search for data in the data warehouse 320 is also available, either through the same metadata/XML parser 416 or, in an preferred embodiment, through the tool administrator 418. The tool administrator 418 provides various information about users of the data warehouse 320, such as who and from what group is authorized to access what data element using what tool. Whole or part of this information can be embedded into the metadata set of each tool, and will be read by the metadata/XML parser 416. Whatever method is used, the information about the users of the data warehouse 320 is made available to the client station 210.

Based on the collected information on the data structure of each data element of the data warehouse 320, the tools that access the data element, and the users who use the tools to analyzing data items stored under the data element, the client station 210 can obtain an overall picture of the implementation of the data warehouse 320.

More specifically, if the structure of the data warehouse 320 is of concern, the client browser at the client station 210 sends a URL or other HTTP (HyperText Transport Protocol) request through the web server 220 to the data warehouse portal 240 inquiring, for example, the hierarchical arrangement of data inside the data warehouse 320. Upon receiving the request, the metadata/XML parser 416 reads the metadata schema of the data warehouse 320, and transfers the hierarchical information to the HTML/XML page generator 412. A view of the hierarchy of data in the data warehouse 320 is generated by the HTML/XML page generator 412, and returned to the client browser. Example of such a hierarchical data view is illustrated in FIG. 5 in which data elements of the data warehouse 320 are arranged in order from high level to low level.

Figure 5:
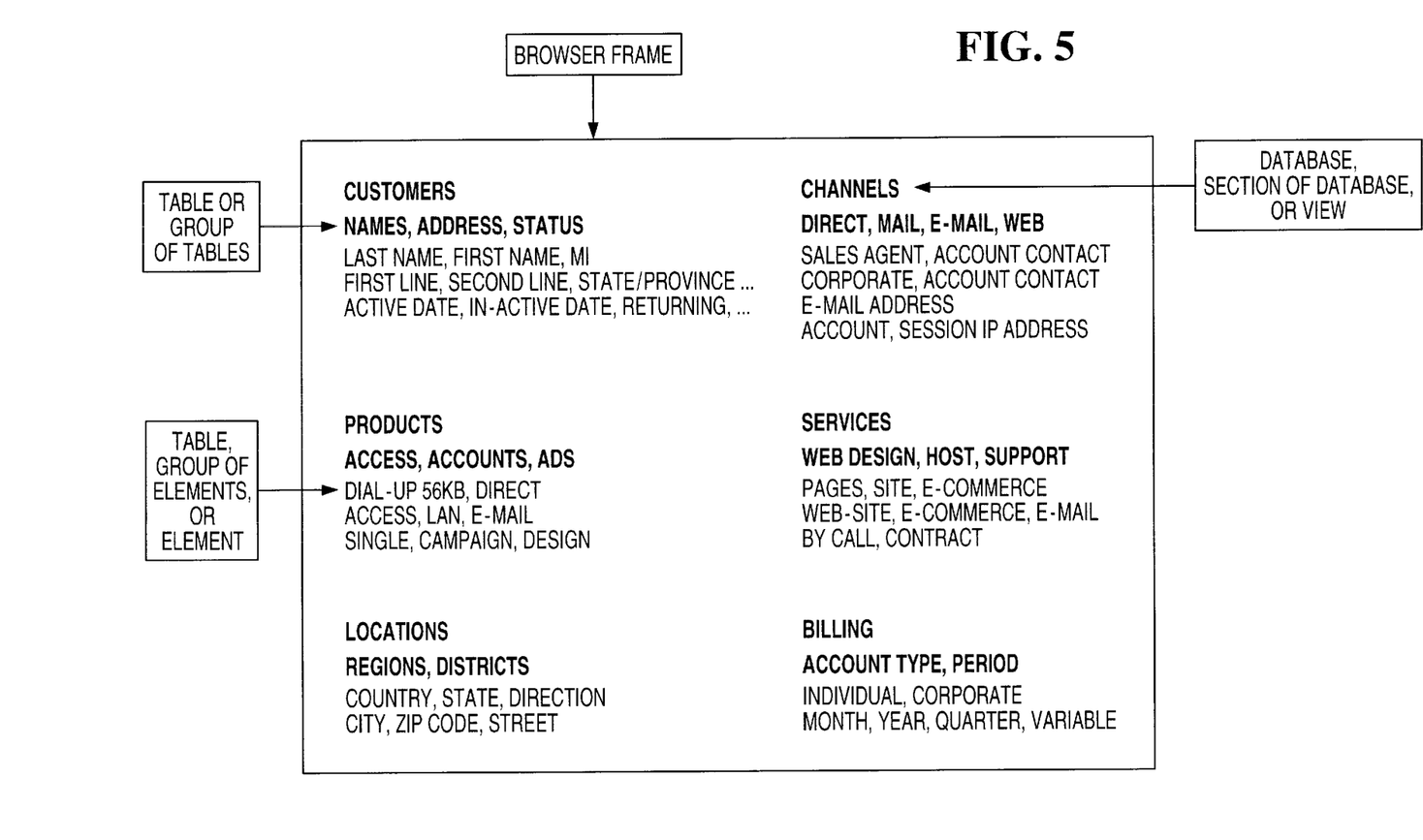
FIG. 5 is a hierarchical view.

As shown in FIG. 5, the highest level in the data hierarchy of the data warehouse 320 is database or database section. Lower levels include tables or group of tables, table columns or group of table columns etc. The view arranged in this way provides the client of the client station 210 with an easy understanding of how data elements are structured either physically or logically in the data warehouse 320. The view also highlights the relationship between data elements such as one-to-many, many-to-one, or many-to-many etc. In the example depicted in FIG. 5, the relationship is shown as one-to-many. That is, each data element at a higher level (e.g., Customers) has a plurality of data elements at a lower level (e.g., Names, Address etc.) each of which in turn has its own set of sub-data elements at a further lower level (e.g., Last Name, First Name etc.) Apparently, other arrangements are available as well to present the data hierarchy of the data warehouse 320 to the client browser in a convenient way. Therefore, the term "view" as used herein should not be construed to any specific arrangement of the information items on a display device of the client station 210. Rather, the term "view" is defined as a collection of information items, such as data hierarchy, to be presented to the client at the client station 210.

Figure 6:
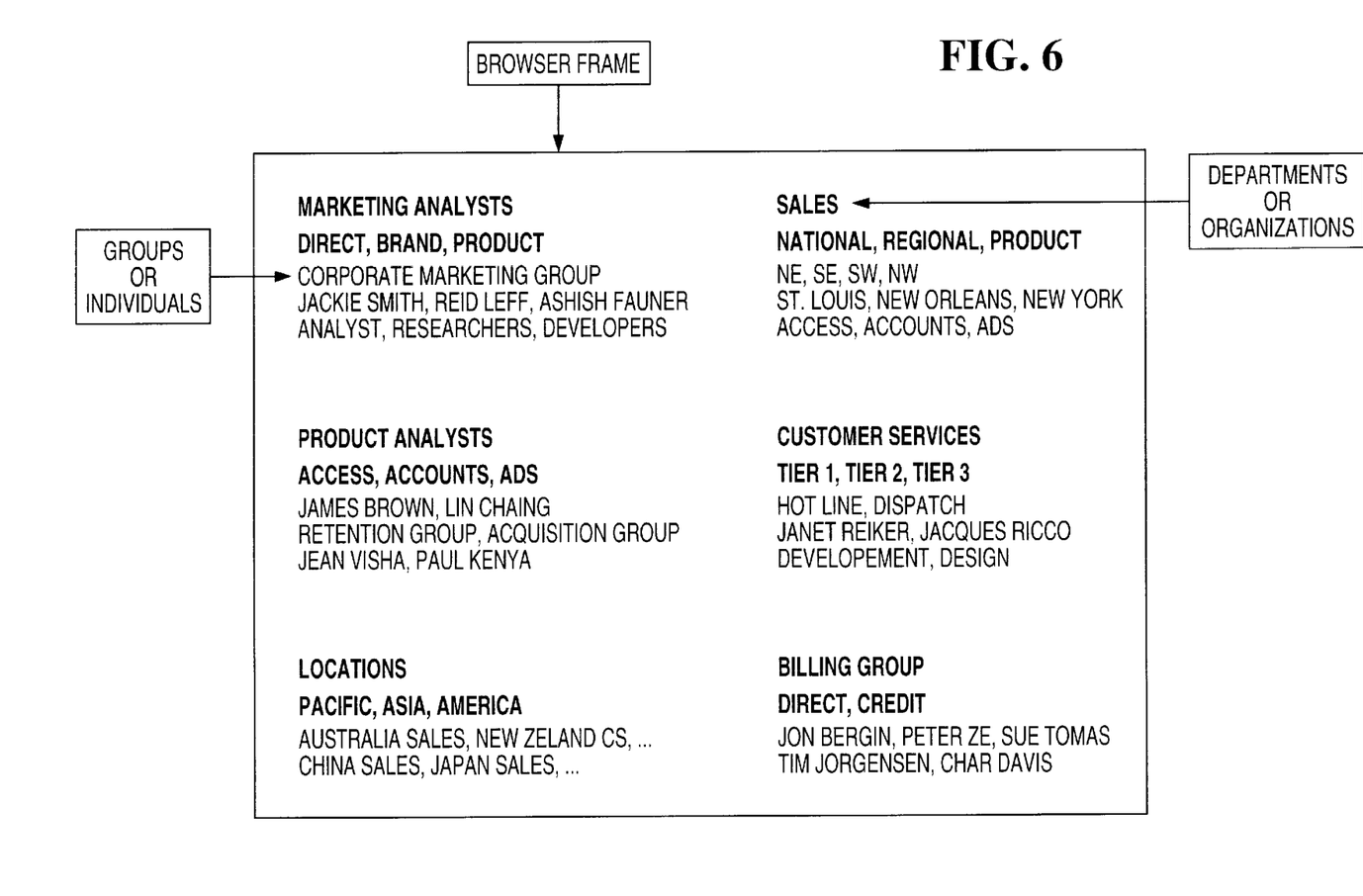
FIG. 6 is a user view.
Figure 7:
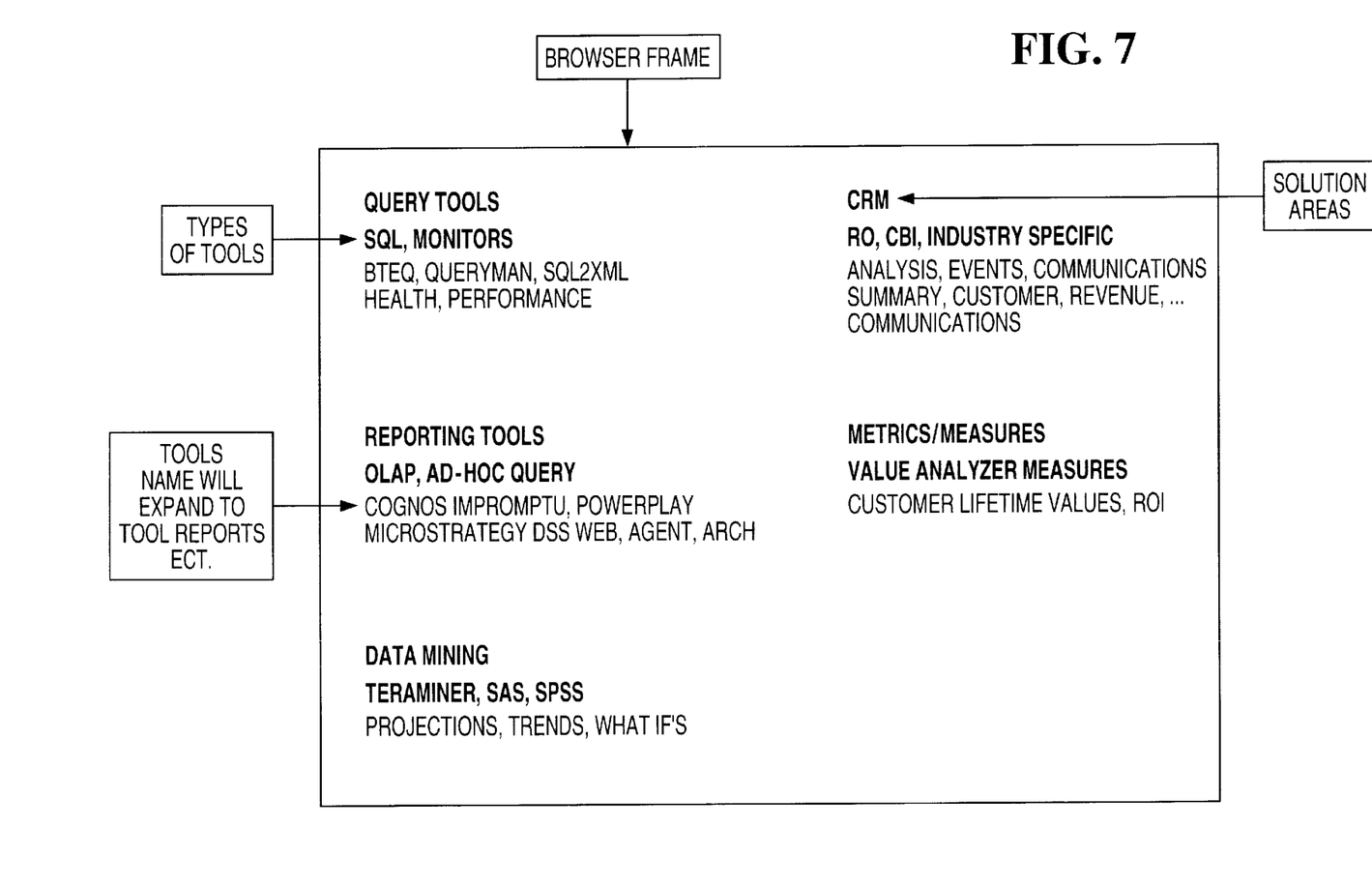
FIG. 7 is a application view.

Similarly, if the URL request inquiring about the users of or the applications available for accessing the data warehouse 320, a user view (depicted in FIG. 6) or an application view (depicted in FIG. 7) will be returned to the client browser at the client station 210, respectively. Once again, the user and application views are preferably presented in order form high level to low level. For example, users of the data warehouse 320 may be arranged by department or organization, followed by groups and individuals. Likewise, accessing tools may be arranged by solution area, followed by types of tools and tool names.

Preferably, each item of the hierarchical, user and application views is presented to the client at the client station 210 as an expandable link. When such a link is activated, another URL request is sent to the data warehouse portal 240 to ask for more specific information on the item associated with the activated link. In that way, the client at the client station 210 can conveniently browse through the views, select an item he is interested in, obtain more detailed information on the item, and repeat the above steps until he is satisfied with the information provided by the data warehouse portal 240 on (i) the data structure of the data elements of the data warehouse 320, (ii) the tools and (iii) the users who use the tools to access the data items. An example of such a detailed view is illustrated in FIG. 8.

Figure 8:
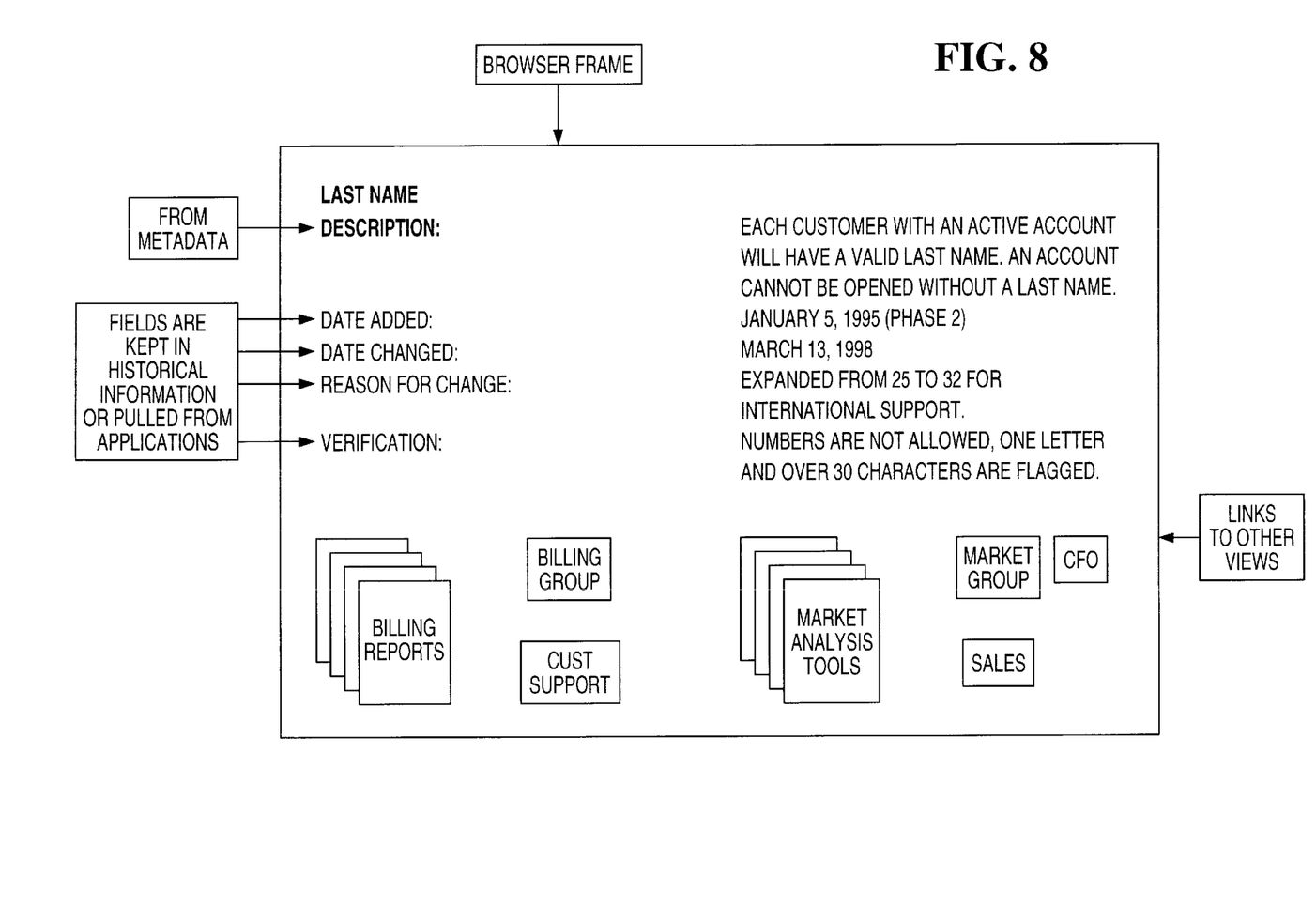
FIG. 8 is an expanded view of a link shown in FIG. 5.

In FIG. 8, details of a data element Last Name is presented in greater details when a link Last Name of the hierarchical view in FIG. 5 is activated. More particularly, the expanded link provides the client at the client station 210 with information retrieved from the metadata of the data warehouse 320 such as description of the data element. Various configuration properties of the data element, e.g. field length and entry type (alphabetical only), are also made available to the client from metadata sets of tools that access Last Name. The view in FIG. 8 further contains links to the tools and users who uses at least one of these tools to look at data items stored under Last Name. Alternatively, the client at the client station 210 can choose a narrower view that shows only users or applications which currently use the data element Last Name. This view helps the client at the client station 210 understand the impact of changing a data element.

As can be seen from FIG. 8, certain information presented in the view, such as Date added, Date changed, and Reason for change, are pulled not from the metadata of the data warehouse 320 or tools 422. The information is pulled from the version and historical information access 420 which stores logs reflecting past/current/future statuses (updated, outdated, etc.) of the implementation of the data warehouse 320. The version and historical information access 420 either accesses a special database or databases (not shown) of the data warehouse 320 for the historical information, or keeps track of the updates itself. In the particular view of FIG. 8, a date of and a reason for a previous change to the data element Last Name are made available by the version and historical information access 420 to the client at the client station 210 who may be interested in a past implementation of the data warehouse 320. If there are more than one past updates to a data element, the version and historical information access 420 preferably store/access and transfer all information on these updates to the client station 210 as well.

Alternatively and/or additionally, the version and historical information access 420 may show future update to a data element. This may be important to the client at the client station 210 who, for example, has requested a new data element to be added to the data warehouse 320 to accommodate a new tool or to receive data from a new source, and wants to keep track of what was requested. In this situation, the data element may not be immediately available for data mining after being created since the amount of data stored in the new data element at that time may not be sufficient for an accurate report and/or analysis. It usually takes some period of time before the data element can be properly populated from one or more data sources. Thus, it is important to the client at the client station 210 to know both when the new data element is created and when it will be properly populated. As used herein, the term "update" is intended to denote not only structural change of a data element but also changes to data items stored under the data element.

Besides the above mentioned hierarchical, user, application and historical views, other views, such as extraction, usage, and comparison views (not shown) are also used to gain insight about the data and how it is used. An extraction view of a data element will show sources of data items of the data element, and any manipulation that has been performed on the data items before they are stored in the data warehouse 320. The sources can be both external and internal. In the former case, the data items are imported from external sources such as an operational database that stores information reflecting daily transactions of a department. In the later case, the data items are moved from a database or table in the same data warehouse 320 to the data element of interest. This is likely to happen when the data element is created temporarily to store manipulated data necessary for a reporting or analyzing tool. The manipulation or manipulations may be simple, such as a operation rounding, or complex, such as an equation with variables and field names. Preferably, the extraction view will shows data source(s), manipulation(s) out to the source, and the resolve. The extraction view can be used to show extractions of several data elements at a time, if desired.

The usage view shows the usage of one or more data elements at a particular time. More specifically, through the usage view, the client at the client station 210 will have the number of users who uses the data elements at the particular time, such as hours, days of week, months, years etc. It would be helpful for the client at the client station 210 who plans some changing to a data element because he can choose a convenient time to make the change with the least impact on accessibility to the data element.

The comparison view shows the comparison between at least two data elements to determine if they are the same, and their discrepancies if they are not the same. This view is used to determine if a required data element already exists some where in the data warehouse 320. For example, a first tool may need a temporary table that may have been created by a second tool and could be reused by the first tool. Sometimes the first tool can be implemented easily by just changing some of the field names and the name of the preexisting table. Thus, when a table is found to be very similar to the required table, the comparison view will show if the suspected table can be reused in whole or in part without wasting time and storage space to create the required table again. This technique can also implemented to compare table columns, databases and areas of the data warehouse 320.

In another scenario when an old data model is going to be upgraded to a newer version, the comparison view will show structural resemblance and difference between old and the new data models. Namely, the client at the client station 210 will be aware of what databases, tables or columns are duplicated in the two data models, and what databases, tables or columns of the old data model are not found in the new data model and needed to be created. This data discoverer technique is also useful for merging two data models to render applications written for a first data model executable on data stored in a second data model. Upon learning of the differences between the two data models, one can change either of the data models to fit the other.

To request a change to a data element, a change request form (not shown) is provided in any of the above mentioned views. Preferably, the change request form includes the data element to which the change is requested, the time when the requested change is to be made, and the reason why the change is needed. This request may be incorporated into the future update view as discussed in the foregoing parts.

The planned change can also be presented in an optional view (not shown) which highlights new data elements, additional data, and changes made to the implementation of the data warehouse 320. One method to produce such a view is to compare statuses of the data element before and after the change is made. Another method is to use the search engine/crawler 414 which can be of a well-known web like type but is configured to perform searches strictly within the data warehouse 320. The search engine/crawler 414 provides the client at the client station 210 with a search capability in addition to the browsing capability provided by other views such as hierarchical, user and application views. Using the search engine/crawler 414, the client at the client station 210 can search for both metadata and actual data of the data warehouse 320. For example, the client can search for a specific data element which meets certain structure/ user/application criteria. The client can also search for data elements which have data items that meet certain search criteria, e.g. contain an alphanumeric string. Preferably, a search result view (not shown) is transmitted to the client browser with links to the discovered data elements, which when activated will bring the client browser to a detailed view similar to the one shown in FIG. 8.

It should now be apparent that a method and apparatus of the invention have been described in which the client at the client station 210 can obtain an overall picture of a data warehouse implementation based on the information about data structure of each data element of the data warehouse, tools that access the data element, and users who use the tools to analyzing data items stored under the data element. Though the presentation of data items themselves may not be of a special interest of the client who wants to learn about data structure and data usage of the data warehouse, some example of the actual data stored in an data element of the data warehouse can make certain that the client is looking at the right data element. Therefore, in an embodiment of the invention, a sub-set of actual data stored in a data element may be linked to the detailed view of the data element (FIG. 8). If needed, a full set of actual data may be shown.

Though the foregoing discussion described the situation in which the metadata schema of the data warehouse 320 and metadata sets of each of the tools 422 are read by the data warehouse portal 240 to provide the client with necessary information, the same information and objects of the invention may be obtained by reading XML schemas of the data warehouse 320 and the tools 422. This can be done in those situations when the data warehouse 320 and/or one or more of the tools 422 adopt XML schema instead of metadata standard.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. For example, the data warehouse portal of invention can be implemented for multiple data warehouses instead of a single data warehouse as described above. It is, therefore, intended that the protection granted hereon be limited only by the definition contained in the appended claims and equivalents thereof.

What is claimed is:

1. A method of presenting an implementation of a data warehouse comprising the steps of:
   a) receiving an inquiry requesting information about at least a data element;
   b) retrieving a data structure of the data element from the data warehouse;
   c) determining (i) tools available for accessing the data element, and (ii) users using at least one of the tools to access the data element; and
   d) generating a view in response to the inquiry showing at least one of (i) the data structure retrieved in said retrieving step, (ii) the tools and (iii) the users determined in said determining step.

2. The method of claim 1, wherein said retrieving step comprises accessing metadata or XML schemas describing the data element in the data warehouse.

3. The method of claim 1, further including a step of generating a hierarchical view of a hierarchy of data stored in the data warehouse, said hierarchical view comprising at least one of databases, database sections, tables, and table columns.

4. The method of claim 3, comprising selecting the data element from the data hierarchy during said receiving step.

5. The method of claim 1, wherein said determining step comprises querying an application set exploiting data stored in the data warehouse.

6. The method of claim 1, further including a step of generating a user view of users gaining access to the data warehouse, said user view comprising at least one of organizations, groups, and individuals.

7. The method of claim 1, further including a step of generating an application view of an application set exploiting data stored in the data warehouse, said application view comprising at least one of solution areas, application types, and application names.

8. The method of claim 1, further including a step of generating an extraction view comprising sources of data items stored in the data warehouse under the data element, and manipulations performed on the data items being transferred from the sources to the data warehouse.

9. The method of claim 1, further including a step of generating an usage view comprising a pattern of usage of the data element based on at least one of a group of users, a set of tools, and a period of time, whereby an impact of changes to the data element is determined.

10. The method of claim 1, further including a step of generating a historical view comprising at least one of past and future updates to the data element.

11. The method of claim 1, further including a step of generating a comparison view comparing at least one of the data structure of, the tools and the users accessing the data element with at least one of data structure of, tools and users accessing another data element, respectively.

12. The method of claim 1, further including a step of displaying at least an exemplary data item stored in the data warehouse under the data element.

13. The method of claim 1, further including a step of requesting at least one of data change and additional data based on at least one of the data structure of, the tools and the users accessing the data element.

14. The method of claim 1, further including a step of highlighting a data change by comparing at least one of the current data structure of, the tools and the users currently accessing the data element with at least one of data structure of, tools and users accessing the data element in accordance with the data change, respectively.

15. The method of claim 14, wherein the data change is one of past and future updates.

16. The method of claim 1, wherein the data element is one of a data warehouse section, a database, a database section, a table, a group of table column, and a table column.

17. A computer architecture for presenting an implementation of a data warehouse, said computer architecture comprising:
   receiving means for receiving an inquiry requesting information about at least a data element;
   retrieving means for retrieving a data structure of the data element from the data warehouse;
   determining means for determining (i) tools available for accessing the data element, and (ii) users using at least one of the tools to access the data element; and
   generating means for generating a view in response to the inquiry showing at least one of (i) the data structure retrieved by said retrieving means, (ii) the tools and (iii) the users determined by said determining means.

18. A computer system for presenting an implementation of a data warehouse, said computer system comprising:
   a processor; and
   a memory coupled to the processor, the memory having stored therein sequences of instructions, which, when executed by the processor, cause the processor to perform the steps of:
   a) receiving an inquiry requesting information about at least a data element;
   b) retrieving a data structure of the data element from the data warehouse;
   c) determining (i) tools available for accessing the data element, and (ii) users using at least one of the tools to access the data element; and
   d) generating a view in response to the inquiry showing at least one of (i) the data structure retrieved in said retrieving step, (ii) the tools and (iii) the users determined in said determining step.

19. An article for presenting an implementation of a data warehouse, said article comprising:
   at least one sequence of machine readable instructions in machine readable form,
   wherein execution of the instructions by one or more processors causes the one or more processors to perform the steps of:
   a) receiving an inquiry requesting information about at least a data element;
   b) retrieving a data structure of the data element from the data warehouse;
   c) determining (i) tools available for accessing the data element, and (ii) users using at least one of the tools to access the data element; and
   d) generating a view in response to the inquiry showing at least one of (i) the data structure retrieved in said retrieving step, (ii) the tools and (iii) the users determined in said determining step.

20. A data warehouse portal for providing an insight of a data warehouse implementation of a plurality of data warehouses, said data warehouse portal comprising:
   a parser for reading metadata schemas of each of the plurality of data warehouses, and metadata sets of each of a plurality of tools available for exploiting data stored in the plurality of data warehouses;
   a tools administrator for obtaining user information about users who use at least one of the plurality of tools to gain access to the data; and
   a page administrator and generator for receiving an information inquiry, and generating a view in response to the information inquiry, based on at least one of the metadata schemas, the metadata sets, and the user information.

21. The data warehouse portal of claim 20, further including a historical information storage for keeping tracks of past and future updates to data and data structures of the plurality of data warehouses.

22. The data warehouse portal of claim 20, further including at least one of a search engine and a crawling tool for metadata searches within the plurality of data warehouses.

23. The data warehouse portal of claim 20, wherein said parser further reads XML schemas of each of the plurality of tools, the XML schemas being stored in at least one of the plurality of data warehouses.

24. The data warehouse portal of claim 22, wherein said at least one of a search engine and a crawling tool further searches XML schemas of the plurality of tools, the XML schemas being stored in at least one of the plurality of data warehouses.

25. The data warehouse portal of claim 20, wherein said page administrator and generator comprises at least one of HTML page and XML response generators.

26. A data warehouse portal system for providing an insight of a data warehouse implementation of a plurality of data warehouses, said data warehouse portal system comprising:
   a client station housing a client browser for sending an information inquiry; and
   a data warehouse portal server connectable to said client station for providing said client browser, in response to the information inquiry, with inquired information about data structures of, and tools and users accessing data elements of the data warehouses rather than actual data items stored in the data warehouses under the data elements, said data warehouse portal server comprising:
   a parser for reading at least one of metadata and XML schemas of each of the plurality of data warehouses, and at least one of metadata and XML schemas of each of a plurality of tools available for exploiting data stored in the data warehouses;

a tools administrator for obtaining user information about users who use at least one of the tools to gain access to the data; and at least one of HTML page and XML response generators for presenting the inquired information in response to the information inquiry, based on at least one of the metadata and XML schemas of the data warehouses and the tools, and the user information.

27. The data warehouse portal system of claim 26, wherein said data warehouse portal server communicates with the data warehouses through a plurality of connectivities comprising one of ODBC, JBDC and SQL database access.

28. The data warehouse portal system of claim 26, wherein said at least one of HTML page and XML response generators presents the inquired information through a XSL style sheet, whereby a customizable interface between said client browser and said data warehouse portal server is established.

29. The data warehouse portal system of claim 26, further including a web server connectable to said client station and said data warehouse portal server for transferring the information inquiry in form of a URL or other HTTP request from said client station to said data warehouse portal server, and for transferring the inquired information in form of HTML or XML response from said data warehouse portal server to said client station.

30. The data warehouse portal system of claim 26, wherein said client browser is integrated into said data warehouse portal server.

* * * * *